UNITED STATES PATENT OFFICE.

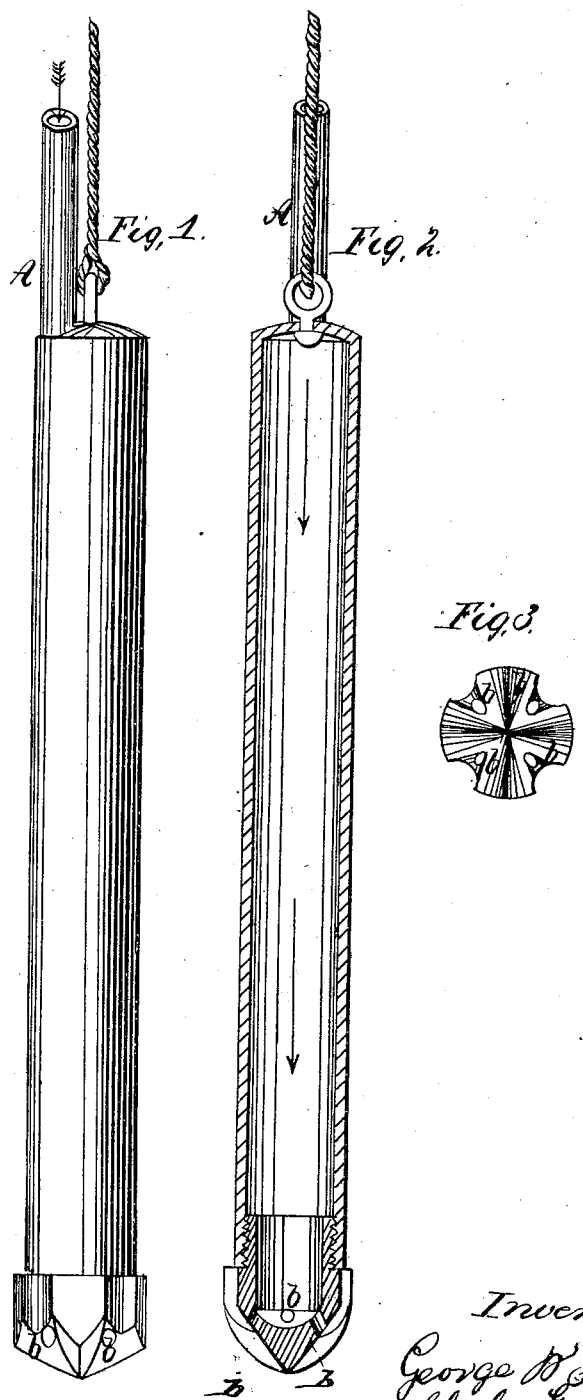

GEO. W. SMITH, OF COVINGTON. KENTUCKY, AND CHAS. F. HENIS, OF CINCINNATI, OHIO.

IMPROVEMENT IN ROCK-DRILLS.

Specification forming part of Letters Patent No. 51,230, dated November 28, 1865.

*To all whom it may concern:*

Be it known that we, GEORGE W. SMITH, of Covington, in the county of Kenton and State of Kentucky, and CHARLES F. HENIS, of Cincinnati, in the county of Hamilton, and State of Ohio, have invented a new and useful Improvement in Rock-Drills; and we do hereby declare that the following is a full and exact description, reference being had to the accompanying drawings, making part of this specification.

Our invention consists, chiefly, in making the stock of the drill partly hollow and providing tube or hose attachments for the purpose of introducing water, under the pressure of a flow of head or other pressure, into the hollow part of the drill-stock, in order to have the water issue therefrom through suitable apertures to free the drill of the boring-meal, and remove the boring-meal by means of the overflow of the water.

To enable others skilled in the art to make and use our invention we will proceed to describe its construction and operation.

The drill is constructed of iron and steel, and of any of the usual forms of drills designed to have a working motion in line with its length. Figure 2 represents a vertical section of one form of drill having our improvement, shown by representing the tube or hose, attached to conduct water to the hollow of the drill B. When A is of an inflexible tube it is necessary to have enough flexible tube or hose at the top of the well to permit as much motion as the lift and fall of the drill, or parts that give motion to the drill. The apertures $b\ b\ b\ b$ are made in number to suit the number of cutting-edges of the drill or increased in size when single bits are used. The flow of the water is regulated by a valve at the top of the well.

The manner of attaching the drill varies to suit for coupling-rods, hawser-laid rope or wire-rope. The last, spliced in the eye at the top of the drill, as shown in Figs. 1 and 2, is preferable for this drill.

In order to operate the drill it is started to work in a vertical direction. The water is conducted through the tube or hose to the drill and its flow regulated to perform the work of freeing the drill and removing, by overflow, the boring-meal produced in boring, thereby facilitating the work and obviating the necessity of frequent stopping for cleansing by the use of sand-pumps and other tools, which require the withdrawal of the rods or rope and change of tools.

What we claim and desire to secure by Letters Patent, is—

1. The method herein described of freeing rock-drills by a jet or jets of water under pressure, which shall also remove by overflow the boring-meal and débris produced by the drill, and jet or jets of water, substantially as set forth in the foregoing specification.

2. The combination and arrangement of the tube or hose and the chambered drill, substantially as hereinbefore described.

GEORGE W. SMITH.
CHARLES F. HENIS.

Witnesses:
 EZRA COPE,
 JOSHUA STANLEY.